US008174787B2

(12) United States Patent
Hashimoto

(10) Patent No.: US 8,174,787 B2
(45) Date of Patent: May 8, 2012

(54) LIBRARY APPARATUS AND METHOD FOR MOVING SHELF OF LIBRARY APPARATUS

(75) Inventor: Kohjiro Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/028,797

(22) Filed: Feb. 16, 2011

(65) Prior Publication Data

US 2011/0134744 A1   Jun. 9, 2011

Related U.S. Application Data

(63) Continuation of application No. PCT/JP2008/002725, filed on Sep. 30, 2008.

(51) Int. Cl.
*G11B 15/68* (2006.01)
(52) U.S. Cl. ..................................... 360/92.1
(58) Field of Classification Search .................. 360/92.1
See application file for complete search history.

(56) References Cited

U.S. PATENT DOCUMENTS

| 7,102,849 | B2 * | 9/2006 | Donkin et al. | 360/92.1 |
| 7,227,715 | B2 * | 6/2007 | Woodruff et al. | 360/96.4 |
| 7,486,472 | B2 * | 2/2009 | Pollard et al. | 360/92.1 |
| 7,630,164 | B2 * | 12/2009 | Sasaki | 360/92.1 |
| 7,782,565 | B2 * | 8/2010 | Starr | 360/92.1 |
| 7,800,861 | B2 * | 9/2010 | Kobayashi | 360/92.1 |

FOREIGN PATENT DOCUMENTS

| JP | 07-021644 | 1/1995 |
| JP | 08-053205 | 2/1996 |
| JP | 2004-178702 | 6/2004 |
| JP | 2005-187204 | 7/2005 |

OTHER PUBLICATIONS

International Search Report for corresponding International Application PCT/JP2008/002725; mailed Nov. 18, 2008.

* cited by examiner

*Primary Examiner* — Mark Blouin
(74) *Attorney, Agent, or Firm* — Staas & Halsey LLP

(57) ABSTRACT

A library apparatus includes a storage shelf including a first movable shelf and a second movable shelf each having a plurality of rows and columns of cells in which storage mediums are to be stored, a drive unit being disposed such that a direction of access to the drive unit for inserting/ejecting of one of the storage mediums is the same as a direction of access to the storage shelf, a conveyor for conveying one of the storage mediums between the storage shelf and the drive unit, and a movement control unit for controlling to lift a specific row of cells of the first movable shelf to produce a space and to move horizontally a specific row of cells of the second movable shelf to a position in the space accessible by the conveyor.

12 Claims, 16 Drawing Sheets

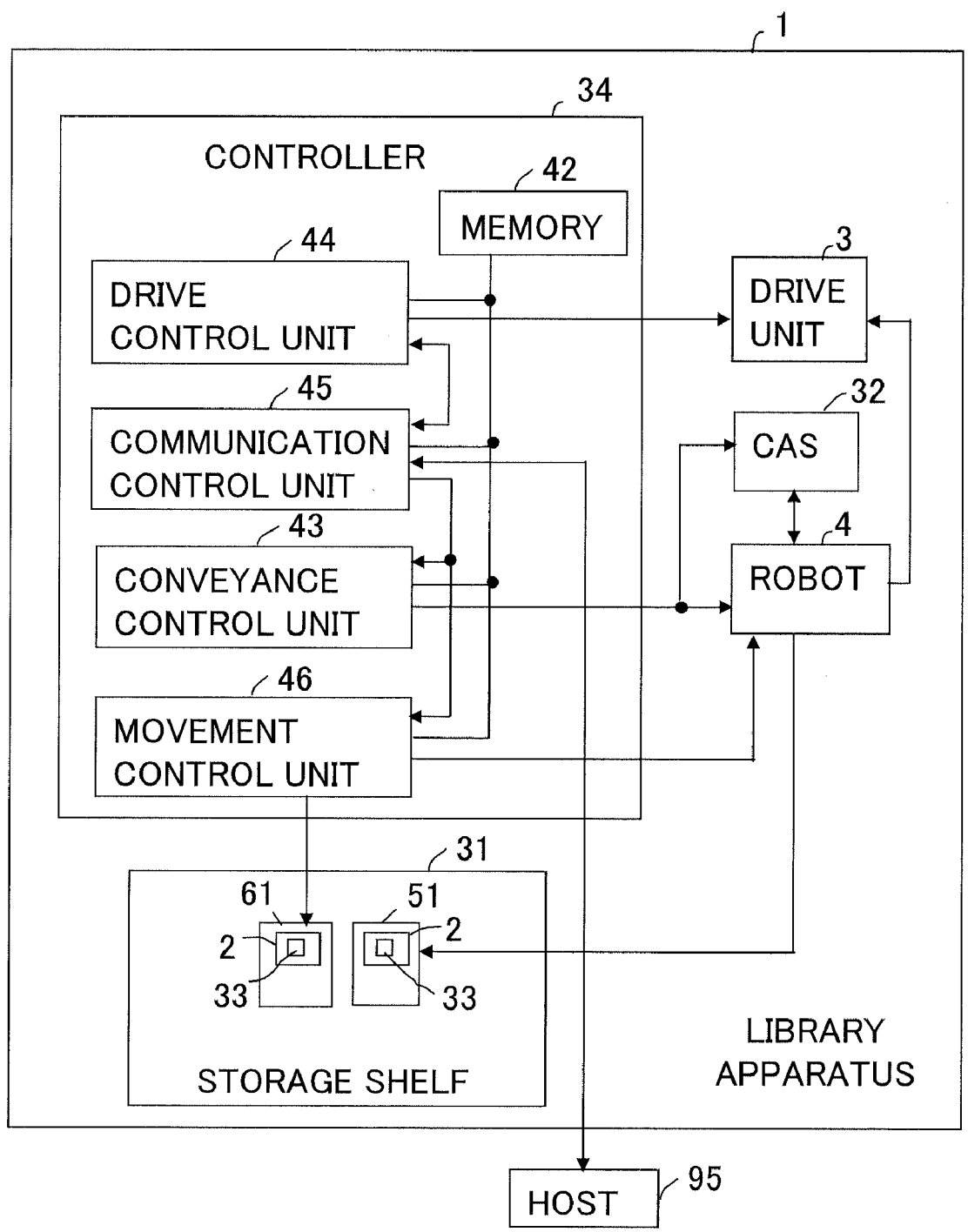

LIBRARY APPARATUS AND METHOD FOR MOVING SHELF OF LIBRARY APPARATUS

CROSS-REFERENCE TO RELATED APPLICATIONS

This is a continuation of Application PCT/JP2008/002725, filed on Sep. 30, 2008, the entire contents of which are incorporated herein by reference.

FIELD

The embodiments discussed herein are related to a technology for a library apparatus and a method of moving shelf of the library apparatus.

BACKGROUND

With recent improvements in the performance of drive units, the volume of data storable in a single reel of a storage medium and the speed of data transfer by a drive unit have been dramatically increased. Accordingly, a tape library apparatus provided in a single casing has become the mainstream. Therefore, storage mediums, drive units, and so forth to be stored in a single casing are desired to be arranged at a high density.

FIG. 1 is an explanatory diagram of a conventional library apparatus. As illustrated in FIG. 1, a library apparatus 100 includes a casing 105. The casing 105 houses assemblies (hereinafter referred to as storage shelves) 102 of shelves (hereinafter referred to as cells) in which storage mediums 101 are stored, drive units 103, each of which performs the recording and reproduction of data into and from a storage medium 101, and a robot 104 that conveys the storage medium 101. The storage shelves 102 are provided on the right and left sides, respectively, of the library apparatus 100 when seen from the front in the direction A. The drive unit 103 is provided at the rear of the library apparatus 100 when seen from the front in the direction A. The robot 104 is provided in a central portion of the library apparatus 100. Such an arrangement is employed in a known method of densely arranging a plurality of reels of the storage mediums 101 and the drive units 103. In this arrangement, the robot 104 has a rotating mechanism so as to be accessible to the storage shelves 102 and the drive units 103 provided in three directions with respect thereto. The robot 104 also has mechanisms realizing vertical and horizontal movements thereof so as to be accessible to the drive units 103 and the storage shelves 102. Another exemplary technique is disclosed in Japanese Laid-open Patent Publication No. 2004-178702.

FIGS. 2A and 2B are other explanatory diagrams of the conventional known library apparatus 100. FIG. 2A is a top view of the library apparatus 100. As illustrated in FIG. 2A, the drive units 103 is oriented such that the depth direction thereof corresponds to the longitudinal direction of the casing 105 so that a storage medium insertion slot thereof faces the robot 104. The library apparatus 100 has dimensional restrictions on the width and depth thereof. Therefore, in a case where the storage shelves 102 are provided in a space avoiding a space in which the drive units 103, which has a large depth, is provided, the widths of the storage shelves 102 are limited. In such an arrangement, the efficiency in providing a sufficient capacity of the storage shelves 102 for storing the storage mediums 101 is reduced.

Referring now to FIG. 2B, the robot 104 has a rotating mechanism 106 so that the robot 104 can be oriented in any directions for access to the storage shelves 102 and the drive units 103. Therefore, a corresponding space extending in the height direction needs to be provided. Consequently, the storage shelves 102 need to be raised by a certain length from the bottom surface of the library apparatus 100. This further reduces the efficiency in providing a sufficient capacity of the storage shelves 102 for storing the storage mediums 101.

SUMMARY

According to an aspect of the invention, a library apparatus includes a storage shelf including a first movable shelf and a second movable shelf each having a plurality of rows and columns of cells in which storage mediums are to be stored, each of the rows of cells of the first movable shelf being movable vertically, each of the rows of cells of the second movable shelf being movable horizontally, a drive unit for performing recording and reproduction of data into and from one of the storage mediums, the drive unit being disposed such that a direction of access to the drive unit for inserting/ejecting of one of the storage mediums is the same as a direction of access to the storage shelf, a conveyor for conveying one of the storage mediums between the storage shelf and the drive unit and for inserting/ejecting one of the storage mediums into/from the storage shelf and the drive unit, and a movement control unit for controlling to lift a specific row of cells of the first movable shelf to produce a space and to move horizontally a specific row of cells of the second movable shelf to a position in the space accessible by the conveyor.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 is a schematic diagram of a library apparatus.

DESCRIPTION OF EMBODIMENTS

Figure 1:
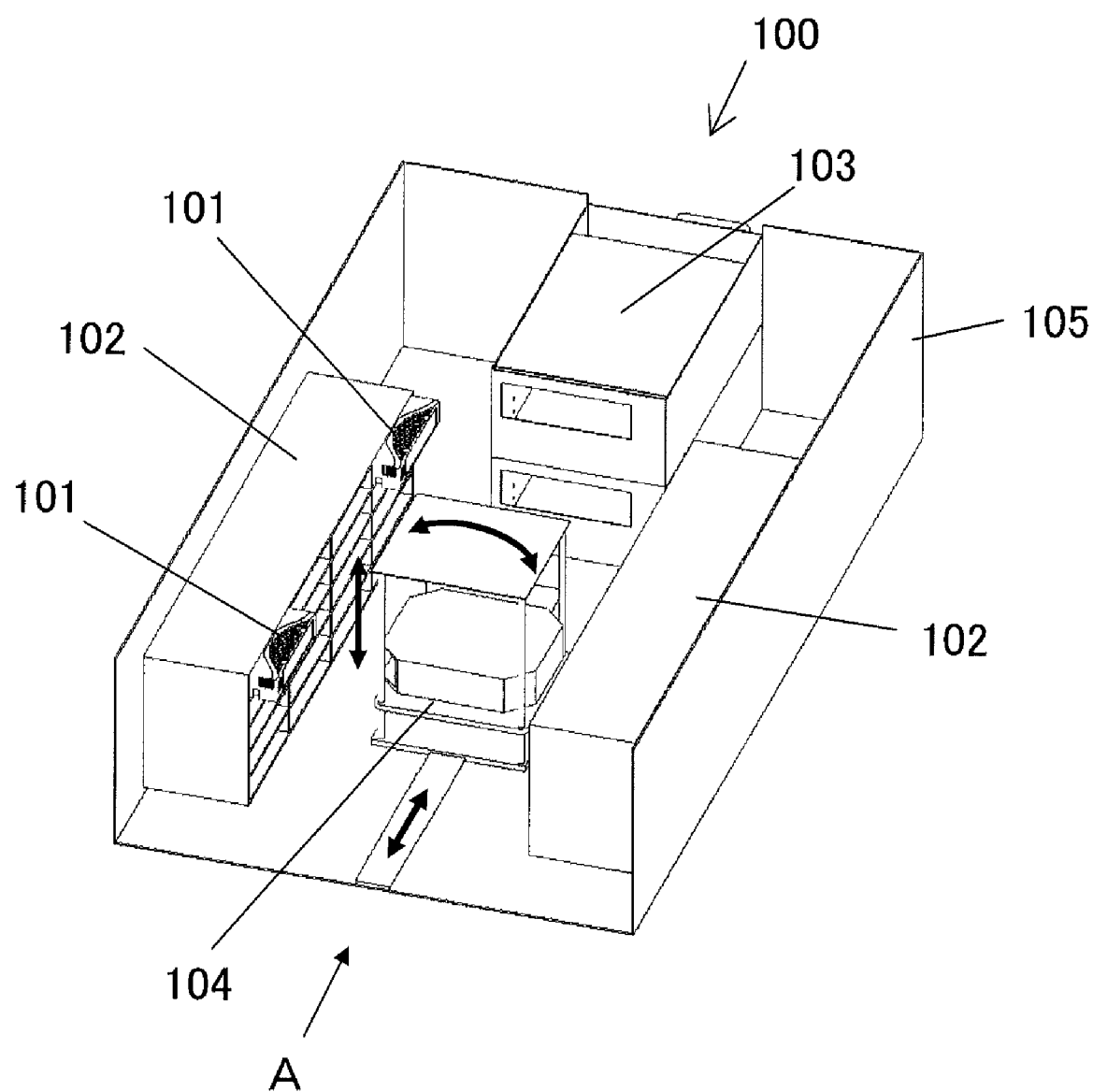
FIG. 1 is an explanatory diagram of a known library apparatus.
Figure 2A:
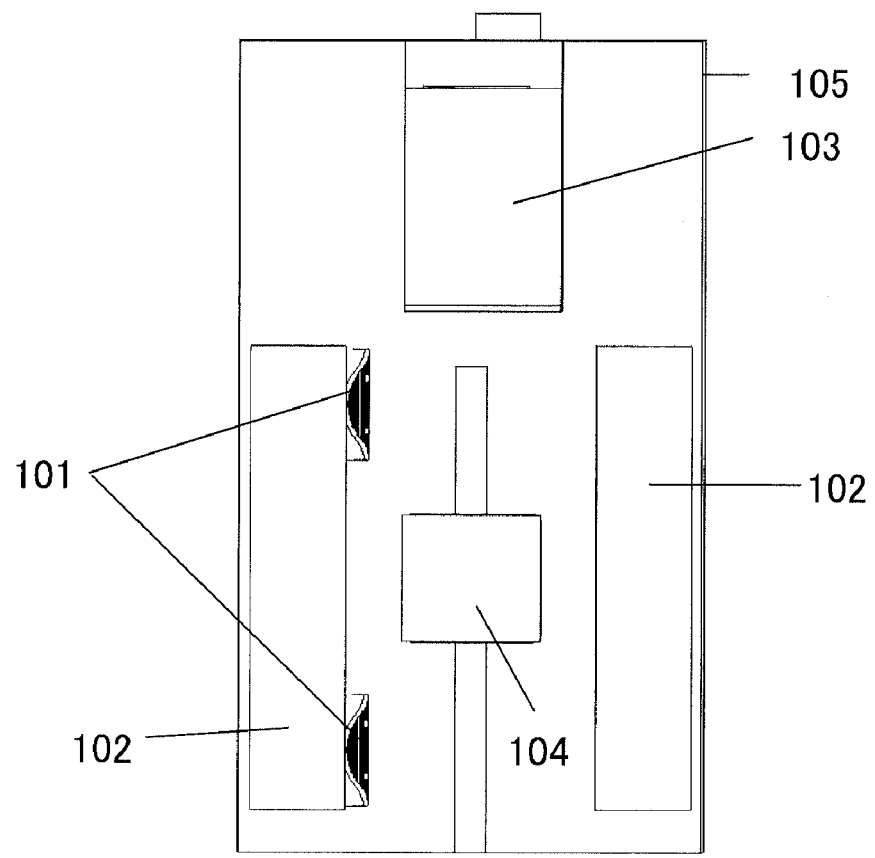
FIGS. 2A and 2B are other explanatory diagrams of the known library apparatus.
Figure 2B:
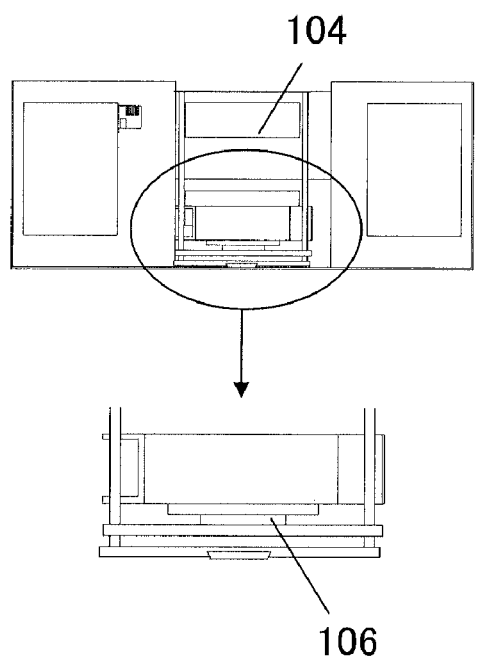

An embodiment of the present invention will now be described. FIG. 3 is a schematic diagram of a library apparatus 1. The library apparatus 1 includes a drive unit 3, a robot 4, a storage shelf 31, a cartridge access station 32 (hereinafter abbreviated to CAS 32), storage mediums 33, and a controller 34.

The drive unit 3 is a magnetic-tape drive unit that performs the recording and reproduction of data into and from the storage medium 33. The robot 4 functions as a conveyor that is accessible to the drive unit 3 and to a storage medium 33 placed in any of cells 2 or in the CAS 32, and conveys the storage medium 33 between the drive unit 3 and the cell 2 or between the cell 2 and the CAS 32. The storage shelf 31 includes a first movable shelf 51 and a second movable shelf 61 each storing the storage mediums 33 in individual cells 2 thereof. The CAS 32 is a mechanism that loads a storage medium 33 from the outside into the library apparatus 1 and removes the storage medium 33 from the library apparatus 1 to the outside. Each storage medium 33 is, for example, a cartridge tape in which a reel of magnetic tape is housed in a casing. The storage medium 33 has on the back thereof a barcode label on which an identification number or the like is recorded.

The controller 34 controls the entirety of the library apparatus 1. For example, the controller 34 controls the driving of the storage shelf 31. Furthermore, when the controller 34 receives from a host 95 an instruction for recording or reproduction of data into or from a specific storage medium 33, the controller 34 causes the robot 4 to move to one of the cells 2 having the storage medium 33 labeled with the identification number specified by the host 95. Subsequently, the robot 4 removes the storage medium 33 from the cell 2, conveys the storage medium 33 to the drive unit 3, and loads the storage medium 33 into the drive unit 3. After the completion of recording or reproduction of data, the robot 4 removes the storage medium 33 from the drive unit 3, conveys the storage medium 33 to the same cell 2, and places the storage medium 33 into the cell 2. The controller 34 includes a memory 42, a conveyance control unit 43, a drive control unit 44, a communication control unit 45, and a movement control unit 46.

The memory 42 stores various programs, data, and the like of the library apparatus 1.

The conveyance control unit 43 drives the robot 4 to move to the cell 2 having the storage medium 33 labeled with the identification number specified by the host 95. Subsequently, the conveyance control unit 43 causes the robot 4 to remove the storage medium 33, to convey the storage medium 33 to the drive unit 3, and to load the storage medium 33 into the drive unit 3. After the completion of recording or reproduction of data performed by the drive unit 3, the conveyance control unit 43 causes the robot 4 to remove the storage medium 33 from the drive unit 3, to convey the storage medium 33 to the same cell 2, and to place the storage medium 33 into the cell 2. The conveyance control unit 43 includes a processor and performs relevant processing in accordance with a program stored in the memory 42.

The drive control unit 44 controls the recording and reproduction of data into and from the storage medium 33. The drive control unit 44 includes a processor and performs relevant processing in accordance with a program stored in the memory 42.

The communication control unit 45 controls the communication to and from the host 95. The communication control unit 45 includes a processor and performs relevant processing in accordance with a program stored in the memory 42. The movement control unit 46 controls the movements of the first movable shelf 51 and the second movable shelf 61. The movement control unit 46 includes a processor and performs relevant processing in accordance with a program stored in the memory 42.

Figure 4:
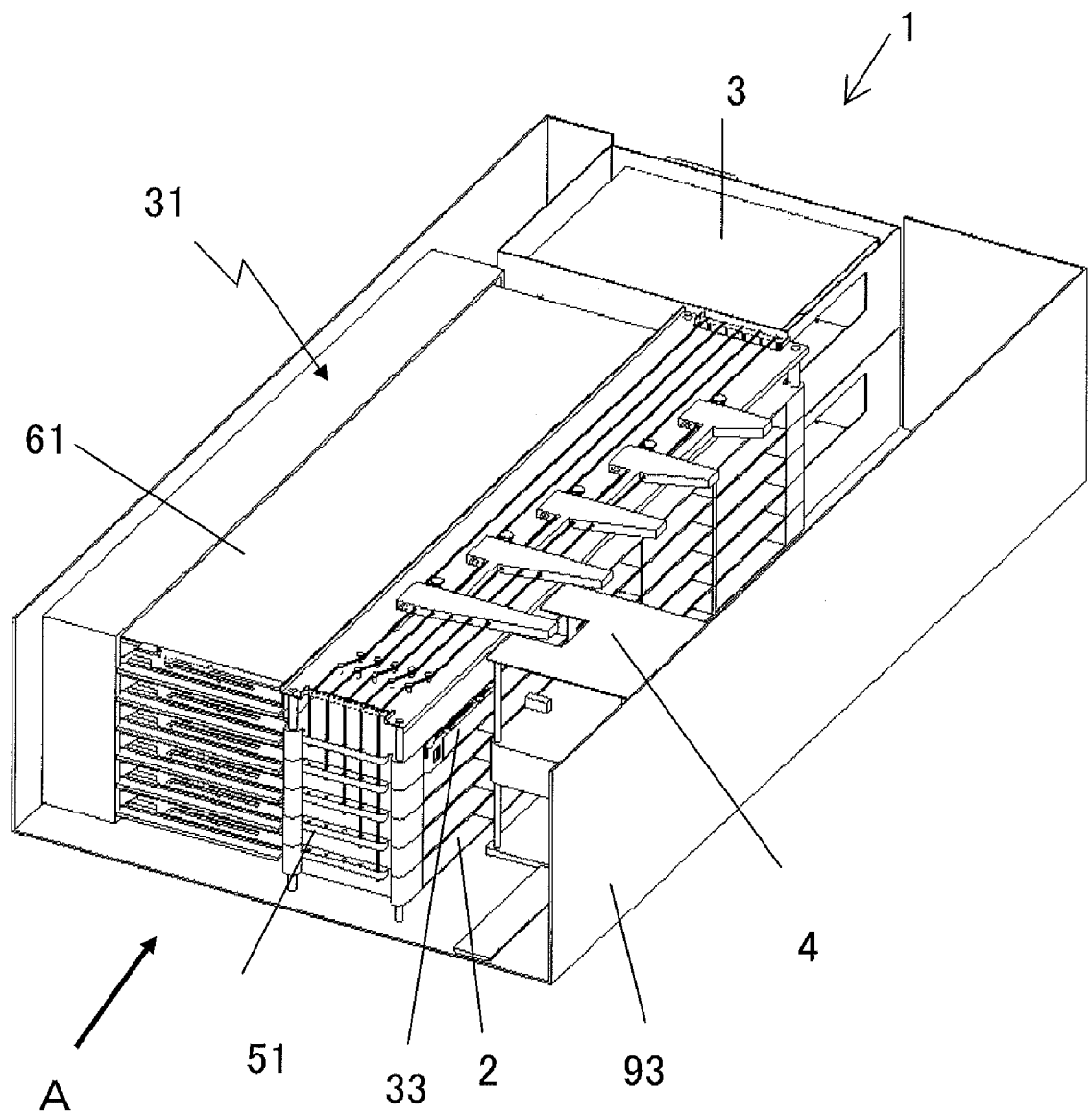
FIG. 4 illustrates the arrangement of relevant units included in the library apparatus.

FIG. 4 illustrates the arrangement of relevant units included in the library apparatus 1, specifically, the arrangement of the drive unit 3, the storage shelf 31, and the robot 4 provided in the library apparatus 1. The drive unit 3 is provided at the rear of a casing 93 when seen from the front of the library apparatus 1 in the direction A. The drive unit 3 is oriented such that the depth direction thereof, when seen from the side of insertion of the storage medium 33, corresponds to the lateral direction of the casing 93. The storage shelf 31 is provided on the near the front side of the casing 93 when seen from the front of the library apparatus 1 in the direction A. The first movable shelf 51 is adjacent to and on the left side of the robot 4 when seen from the front of the library apparatus 1 in the direction A. The second movable shelf 61 is adjacent to and on the left side of the first movable shelf 51 when seen from the front of the library apparatus 1 in the direction A.

The robot 4 is movable in the depth direction of the casing 93 when seen from the front of the library apparatus 1 in the direction A. The robot 4 is adjacent to and on the right side of the first movable shelf 51 when seen from the front of the library apparatus 1 in the direction A. The robot 4 is movable only in the vertical and horizontal directions between the storage shelf 31 and the drive unit 3, and does not therefore include any rotating mechanism. The robot 4 accesses the second movable shelf 61 from the same position as for the access to the first movable shelf 51. The robot 4 includes a hand (not illustrated) with which the storage medium 33 is taken from and placed into any one of the cells 2 and a charge-coupled-device (CCD) sensor (not illustrated) with which the identification number or the like of the storage medium 33 is detected. The directions of access of the robot 4 to the first movable shelf 51 and to the drive unit 3 are the same. Therefore, the robot 4 moves only in two directions, i.e., in the vertical and depth directions of the casing 93 when seen from the front of the library apparatus 1 in the direction A. Thus, a simple configuration is realized.

Figure 5A:
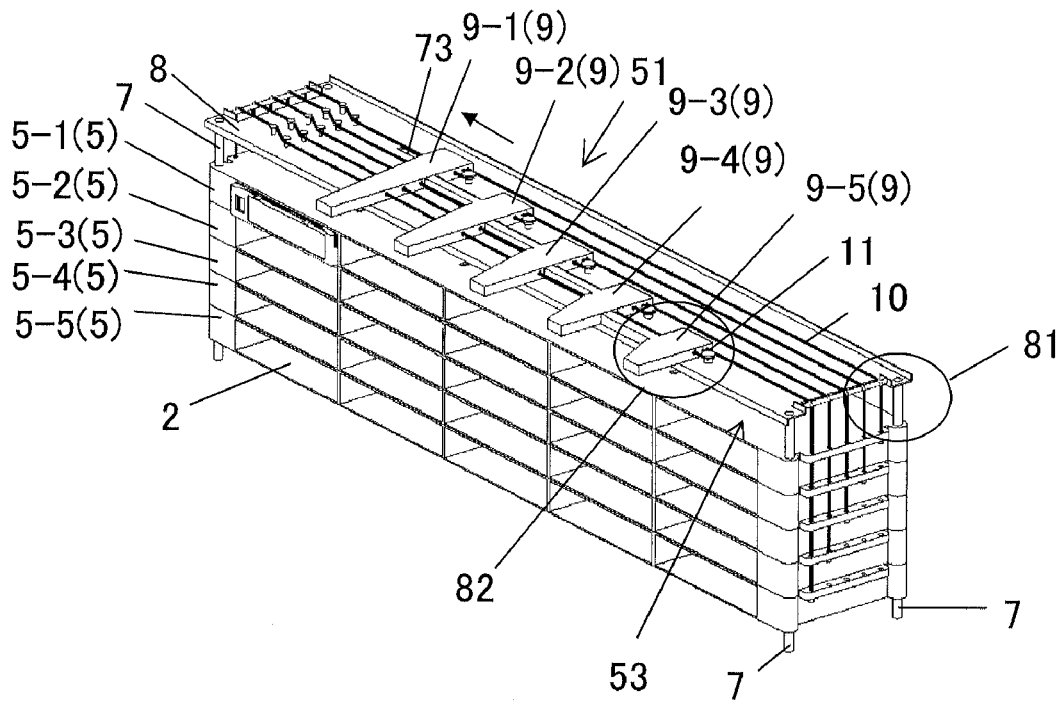
FIGS. 5A to 5C are explanatory diagrams of a first movable shelf.
Figure 5B:
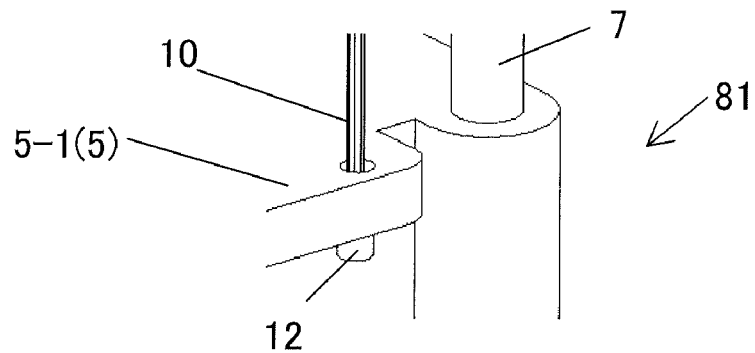
Figure 5C:
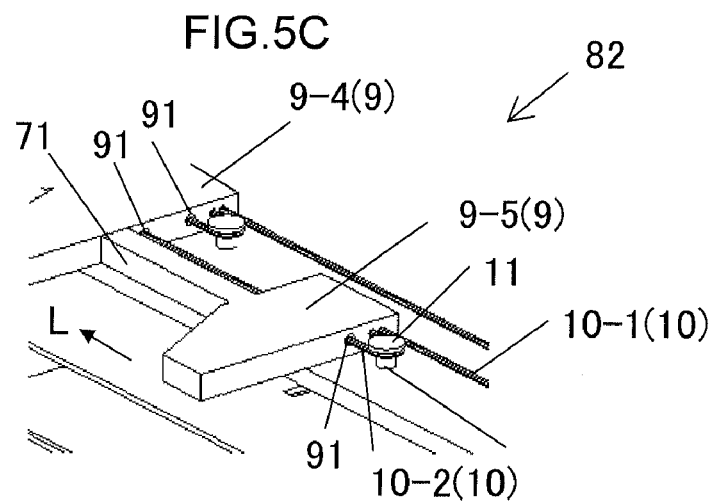

FIGS. 5A to 5C are explanatory diagrams of the first movable shelf 51. FIG. 5A illustrates the configuration of the first movable shelf 51. The first movable shelf 51 includes a plurality of cells 2, in which storage mediums 33 are to be stored, arranged in rows and columns forming a matrix. Each row of cells (hereinafter referred to as a vertically slidable cell group 5) of the first movable shelf 51 is vertically movable. In the present embodiment, the first movable shelf 51 includes five rows and five columns of cells 2. That is, the first movable shelf 51 includes five vertically slidable cell groups 5 stacked one on top of another and each including five cells 2. As illustrated in FIG. 5A, the vertically slidable cell groups 5 include vertically slidable cell groups 5-1 to 5-5. A space 53 is provided between the vertically slidable cell group 5-1 and a top board 8. The space 53 is provided for moving the vertically slidable cell groups 5 upward and for receiving the second movable shelf 61 moved thereinto. The first movable shelf 51 includes a movement mechanism for moving the vertically slidable cell groups 5-1 to 5-5. The movement mechanism includes shafts 7, levers 9, wires 10, shafts 11, securing ends 12, and oblong holes 73. The shafts 7 extend through holes provided at the four corners of each of the vertically slidable cell groups 5-1 to 5-5. Thus, the vertically slidable cell groups 5-1 to 5-5 included in the first movable shelf 51 are vertically movable along the shafts 7. The four shafts 7 are fixed to the top board 8. The top board 8 has five oblong holes 73, into which five lifting levers 9 (9-1 to 9-5) are fitted. The levers 9 are movable along the respective oblong holes 73. The wires 10 are for lifting the vertically slidable cell groups 5 and are connected to the levers 9. The wires 10 extending from the levers 9 are connected to the vertically slidable cell groups 5.

FIG. 5B is an enlarged view of a part 81 including one shaft 7 and relevant elements provided therearound. The vertically slidable cell group 5-1 rests on the securing ends 12 provided to corresponding ones of the wires 10. Therefore, the lever 9-1 is continuously pulled by the wires 10 under the weight of the vertically slidable cell group 5-1 resting on the securing ends 12. In such a configuration, when the lever 9-1 is slid along the oblong hole 73 in the direction of the arrow illustrated in FIG. 5A, the vertically slidable cell group 5-1 resting on the securing ends 12 of the wires 10 is lifted along the shafts 7. When the lever 9-2 is slid in the state illustrated in FIG. 5A, the lever 9-1 on the left side of the lever 9-2 is pushed and is also slid, and the vertically slidable cell groups 5-1 and 5-2 resting on the securing ends 12 of the wires 10 extending from the levers 9-1 and 9-2 are lifted. When the lever 9-3 is slid, the levers 9-1 and 9-2 on the left side of the levers 9-3 are pushed and are also slid, and the vertically slidable cell groups 5-1 to 5-3 resting on the securing ends 12 of the wires 10 extending from the levers 9-1 to 9-3 are lifted. The mechanism of movements of the levers 9-2 and 9-3 also applies to individual cases where the levers 9-4 and 9-5 are moved.

FIG. 5C is an enlarged view of a part 82 including the lever 9-5 and relevant elements provided therearound. As illustrated in FIG. 5C, two wires 10 (10-1 and 10-2) each have one end thereof fixed to the lever 9-5. The wire 10-1 extends from the lever 9-5 and is directly connected to one side face of the vertically slidable cell group 5-5 (see FIG. 5A). The wire 10-2 extends from the lever 9-5, runs around a corresponding one of the shafts 11, extends in the direction opposite to the direction of the wire 10-1 while passing through through-holes 91 provided in the levers 9-5 to 9-1, and is connected to the opposite side face of the vertically slidable cell group 5-5. The wire 10-2 simply passes through and is not fixed to the through-holes 91. The shafts 11 are fixed to the top board 8. The lever 9-5 has a coupling shaft 71 for coupling with the lever 9-4 adjacent thereto. The coupling shaft 71 is removably inserted into a groove (not illustrated) provided in the lever 9-4. The coupling shaft 71 is provided for each of the levers 9-2 to 9-5. For example, when the lever 9-5 is slid in the direction L, the levers 9-4 to 9-1 are also slid through the coupling shafts 71, whereby the wires 10-1 and 10-2 are pulled. Accordingly, the vertically slidable cell groups 5-1 to 5-5 are lifted. Consequently, a space is produced between the vertically slidable cell group 5-5 and the bottom board of the first movable shelf 51.

When the lever 9-4 is slid in the direction L, the vertically slidable cell groups 5-1 to 5-4 are lifted. Meanwhile, the coupling shaft 71 of the lever 9-5 comes off the lever 9-4. Therefore, the vertically slidable cell group 5-5 is not lifted. Consequently, a space is produced between the vertically slidable cell group 5-4 and the vertically slidable cell group 5-5.

The oblong holes 73 other than that for the lever 9-1 are provided below the coupling shafts 71 of the levers 9-2 to 9-5.

The above detailed description of the connection between the lever 9-5 and the vertically slidable cell group 5-5 also applies to individual cases of connections for the levers 9-1 to 9-4.

Figure 6A:
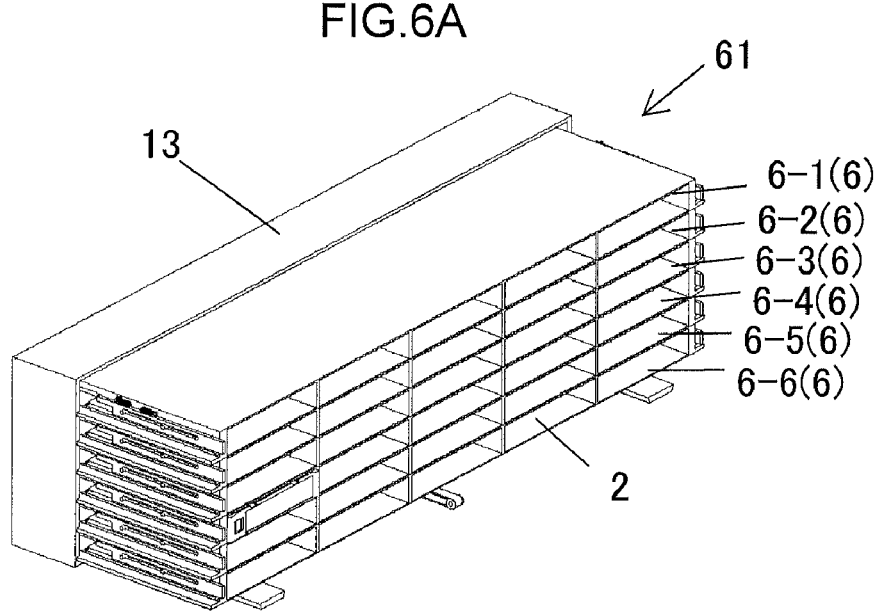
FIGS. 6A to 6C are explanatory diagrams of a second movable shelf.
Figure 6B:
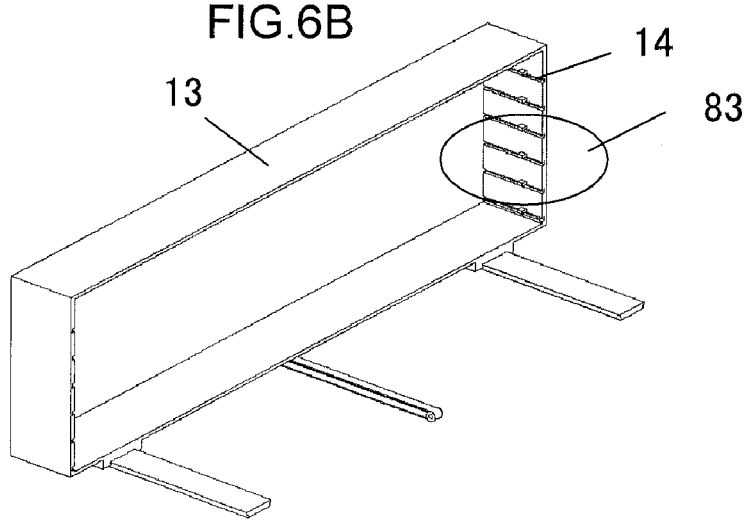
Figure 6C:
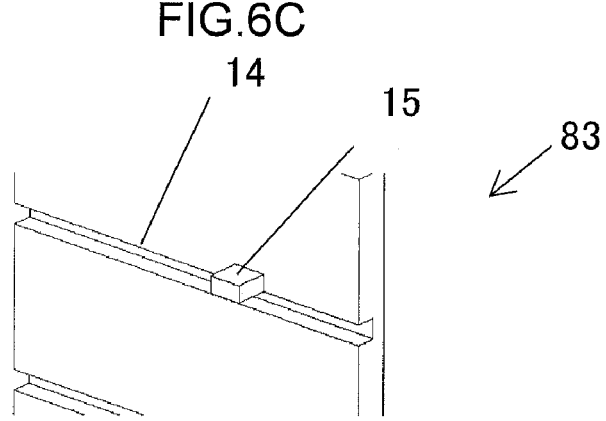

FIGS. 6A to 6C are explanatory diagrams of the second movable shelf 61. FIG. 6A illustrates the configuration of the second movable shelf 61. The second movable shelf 61 includes a plurality of cells 2, in which storage mediums 33 are to be stored, arranged in rows and columns forming a matrix. Each row of cells (hereinafter referred to as a horizontally slidable cell group 6) of the second movable shelf 61 is horizontally movable. The second movable shelf 61 includes, for example, six rows and five columns of cells 2 and a slide base 13 functioning as a movement drive unit. That is, the second movable shelf 61 includes six horizontally slidable cell groups 6 stacked one on top of another and each including five cells 2. As illustrated in FIG. 6A, the horizontally slidable cell groups 6 include horizontally slidable cell groups 6-1 to 6-6. The slide base 13 horizontally slides the horizontally slidable cell groups 6.

The positions of the horizontally slidable cell groups 6 mounted on the slide base 13, as illustrated in FIG. 6A, are referred to as the initial positions of the horizontally slidable cell groups 6.

FIG. 6B illustrates the appearance of the slide base 13. The slide base 13 has six guide grooves 14 in each of the inner side faces thereof. The guide grooves 14 receive the horizontally slidable cell groups 6 inserted into the slide base 13.

FIG. 6C is an enlarged view of a part 83 illustrating one of the guide grooves 14 of the slide base 13. The guide grooves 14 are provided with blocks 15, respectively, fitted therein. The blocks 15 engage with guide grooves 16 (see FIG. 8B), respectively, of the horizontally slidable cell groups 6. When the slide base 13 is driven, the blocks 15 push the horizontally slidable cell groups 6 held in the guide grooves 14 from the initial positions toward the first movable shelf 51. Furthermore, the blocks 15 push the horizontally slidable cell groups 6 held in the guide grooves 14 back to the initial positions.

Figure 7:
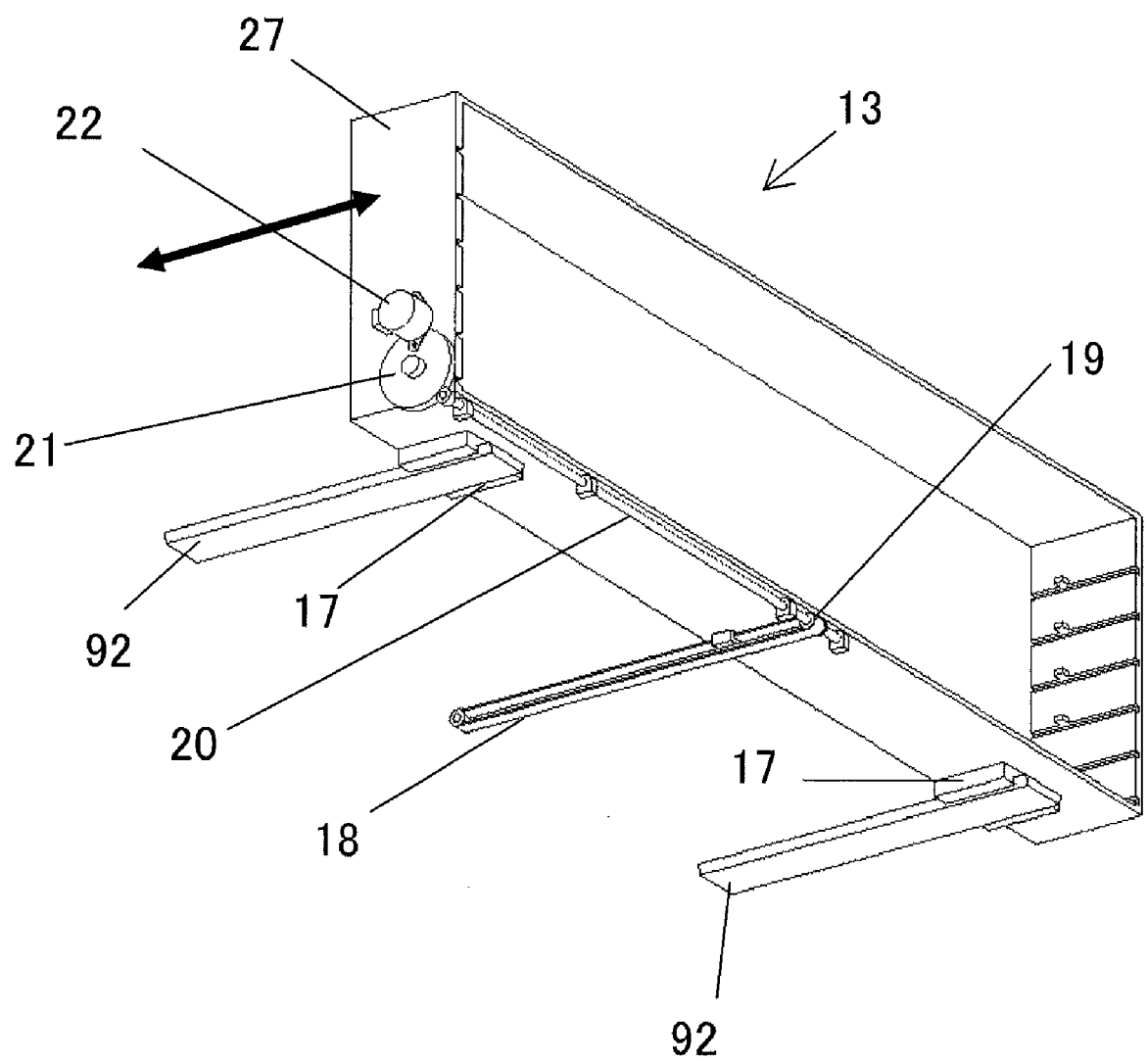
FIG. 7 is an explanatory diagram of a drive mechanism of a slide base.

FIG. 7 is an explanatory diagram of a drive mechanism of the slide base 13. The slide base 13 includes a slide-base body 27 and a drive mechanism for driving the slide-base body 27. The slide-base body 27 has guide units 17 fixed thereto. The drive mechanism includes a timing belt 18, pulleys 19, a shaft 20, a gear 21, and a motor 22. The timing belt 18 is provided on the slide-base body 27. The guide units 17 enable the slide-base body 27 to slide along guide rails 92, respectively. The guide rails 92 are provided on the casing 93 so as to allow the guide units 17 to slide therealong. The movement control unit 46 of the controller 34 causes the motor 22 to rotate, whereby the shaft 20 is rotated through the gear 21 connected to the motor 22. The rotation of the shaft 20 causes the timing belt 18 stretched between the pulleys 19 to rotate. The rotation of the timing belt 18 causes the guide units 17 to slide along the guide rails 92 provided on the casing 93. Thus, with the rotation of the timing belt 18, the slide-base body 27 of the slide base 13 moves as indicated by the two-directional arrow.

Figure 8A:
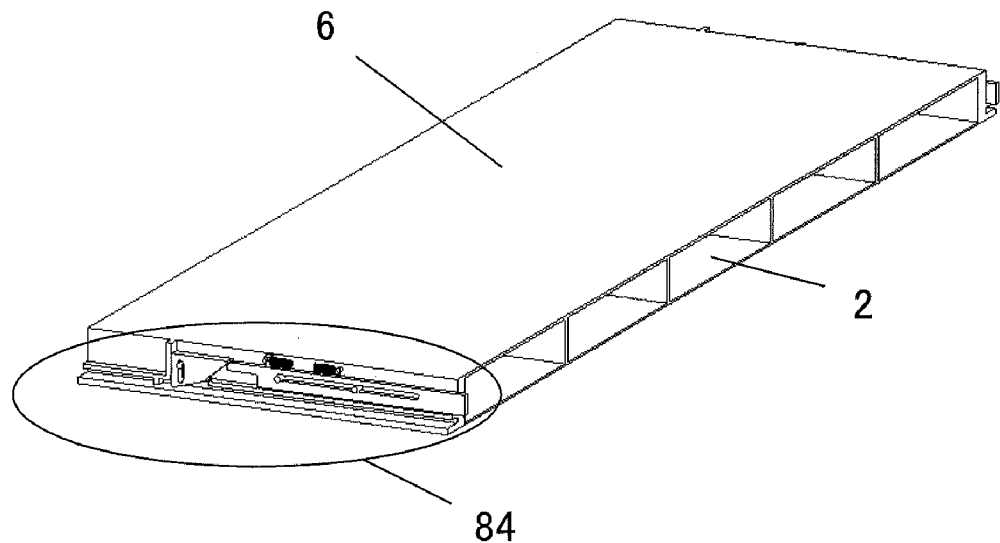
FIGS. 8A to 8C are explanatory diagrams of one of horizontally slidable cell groups.
Figure 8B:
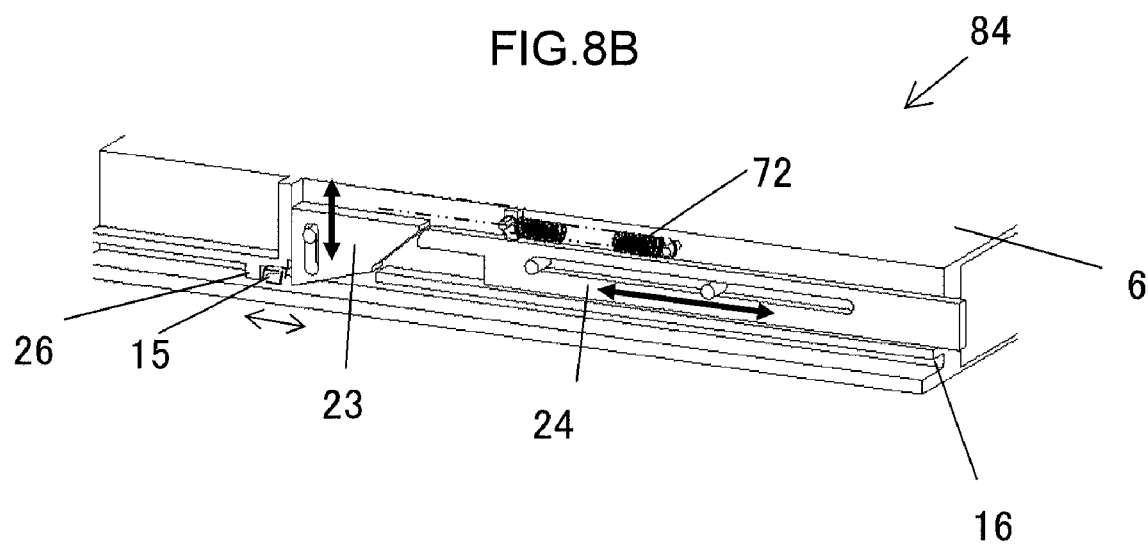
Figure 8C:
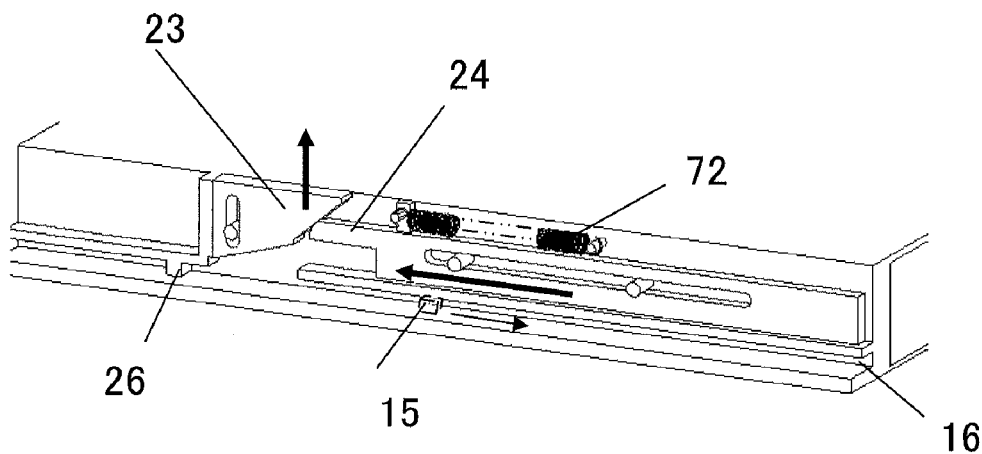

FIGS. 8A to 8C are explanatory diagrams of one of the horizontally slidable cell groups 6. FIG. 8A illustrates the appearance of the horizontally slidable cell group 6. The horizontally slidable cell group 6 is an assembly including a row of five cells 2. FIGS. 8B and 8C are enlarged views of a part 84 illustrating a side face of the horizontally slidable cell group 6 illustrated in FIG. 8A. Each horizontally slidable cell group 6 has on each of the side faces thereof a guide groove 16, a lock block 23, an arm block 24, a spring 72, and a stopper 26. The guide groove 16 is provided for each of the blocks 15 of the slide base 13. The block 15 engages with and moves along the guide groove 16. The lock block 23 and the arm block 24 in combination function as a movement-disabling mechanism.

The lock block 23 enables or disables the movement of the horizontally slidable cell group 6 realized by the block 15 of the slide base 13, and is vertically slidable as indicated by the two-directional arrow illustrated in FIG. 8B. Specifically, when the lock block 23 is at a lower position on the side face of the horizontally slidable cell group 6 as illustrated in FIG. 8B, the lock block 23 is in contact at the lower left end thereof with the block 15 of the slide base 13. Therefore, when the block 15 of the slide base 13 is moved rightward in FIG. 8B along the guide groove 16, the horizontally slidable cell group 6 is moved rightward. When the lock block 23 is at an upper position on the side face of the horizontally slidable cell group 6 as illustrated in FIG. 8C, the block 15 of the slide base 13 is not in contact with the lock block 23. Therefore, the block 15 is moved rightward in FIG. 8C along the guide groove 16 and advances below the lock block 23 and the arm block 24. Hence, the horizontally slidable cell group 6 is not moved.

The arm block 24 adjoins the lock block 23 and is configured to vertically move the lock block 23. FIG. 8B illustrates the arm block 24 at the initial position. As illustrated in FIG. 8B, when the lock block 23 is at the lower position on the side face of the horizontally slidable cell group 6, the upper end of the lock block 23 is in contact with the left end of the arm block 24. As illustrated in FIG. 8B, the arm block 24 is horizontally movable as indicated by the two-directional arrow. One end of the spring 72 is fixed to the arm block 24. The other end of the spring 72 is fixed to the body of the horizontally slidable cell group 6. FIG. 8C illustrates a state where the arm block 24 has been moved to the left toward the lock block 23 by an external force. The left end of the arm block 24 pushes the side face of the lock block 23, whereby the lock block 23 is lifted as indicated by the arrow. In this state, the spring 72 is stretched. When the external force is removed, the arm block 24 is moved rightward by the restoring force of the spring 72. In such a situation, the lock block 23 returns from the position illustrated in FIG. 8C to the position illustrated in FIG. 8B under its own weight.

FIGS. 8B and 8C illustrate an exemplary case where the stopper 26 comes into contact at the right end thereof with the block 15 of the slide base 13. When the block 15 of the slide base 13 is moved leftward in FIGS. 8B and 8C along the guide groove 16, the horizontally slidable cell group 6 is moved leftward.

Referring to FIGS. 9 to 16B, an operation of taking a storage medium 33 from any of the horizontally slidable cell groups 6 will now be described. Suppose that the communication control unit 45 receives from the host 95 a command for reading the data stored in a storage medium 33 placed in the second movable shelf 61. The information on the command is transmitted to the conveyance control unit 43, the drive control unit 44, and the movement control unit 46.

Subsequently, suppose that the movement control unit 46 has determined that the storage medium 33 in a specific cell 2 of the horizontally slidable cell group 6-4 is to be accessed. In this case, the movement control unit 46 controls the following operations numbered from (1) to (9).

Figure 9:
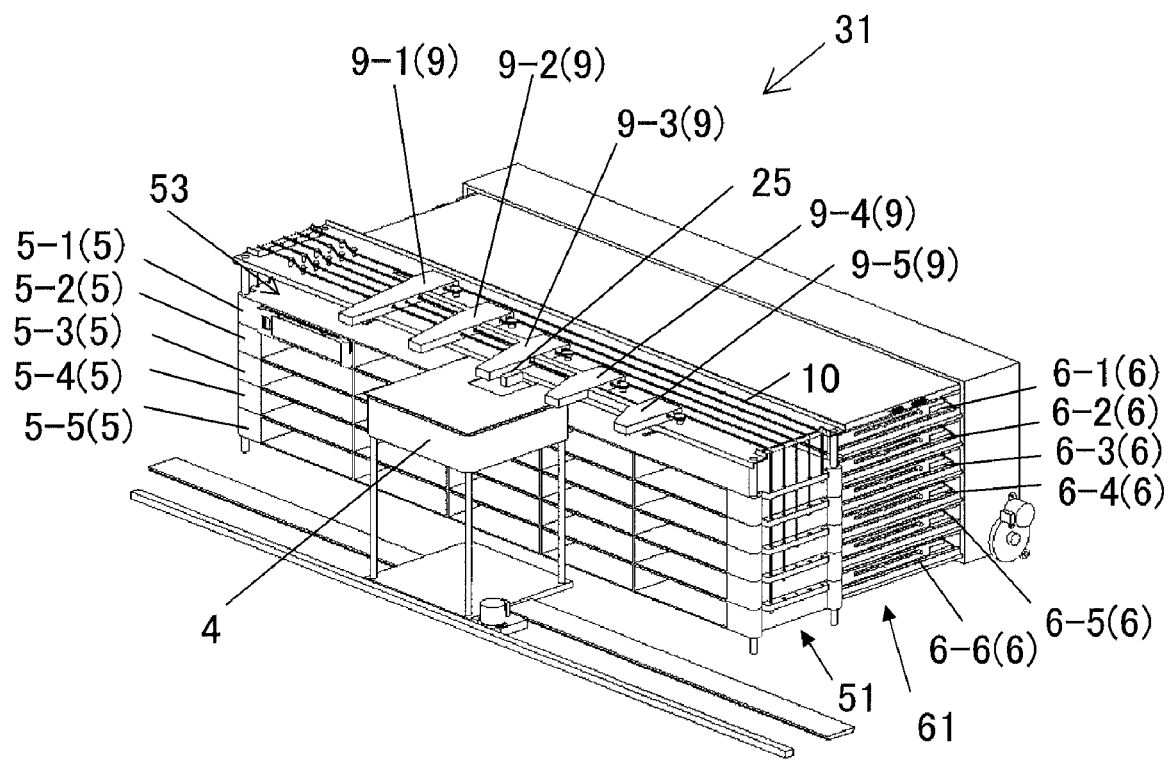
FIG. 9 is an explanatory diagram illustrating where a robot is positioned.

(1) FIG. 9 is an explanatory diagram illustrating where the robot 4 is positioned. In FIG. 9, the first movable shelf 51 and the second movable shelf 61 are at the initial positions. The vertically slidable cell groups 5-1 to 5-5 are at positions corresponding to the horizontally slidable cell groups 6-2 to 6-6, respectively. Specifically, the vertically slidable cell group 5-1 is at the position corresponding to the horizontally slidable cell group 6-2, the vertically slidable cell group 5-2 is at the position corresponding to the horizontally slidable cell group 6-3, the vertically slidable cell group 5-3 is at the position corresponding to the horizontally slidable cell group 6-4, the vertically slidable cell group 5-4 is at the position corresponding to the horizontally slidable cell group 6-5, and the vertically slidable cell group 5-5 is at the position corresponding to the horizontally slidable cell group 6-6. The horizontally slidable cell group 6-1 is at the position corresponding to the space 53 provided in the first movable shelf 51. The above correspondence is stored as a piece of data in the memory 42. First, with reference to the memory 42, the movement control unit 46 specifies the vertically slidable cell group 5-3 of the first movable shelf 51 corresponding to the horizontally slidable cell group 6-4 including the cell 2 desired to be accessed. Subsequently, the movement control unit 46 causes the robot 4 to move to a position reaching the top board 8 between the lever 9-3 corresponding to the specified vertically slidable cell group 5-3 and the lever 9-4 on the right side of the lever 9-3. When the robot 4 has reached the foregoing position on the top board 8, a projection 25 provided on the robot 4 is brought into contact with the lever 9-3. The projection 25 is provided for moving the levers 9.

Figure 10:
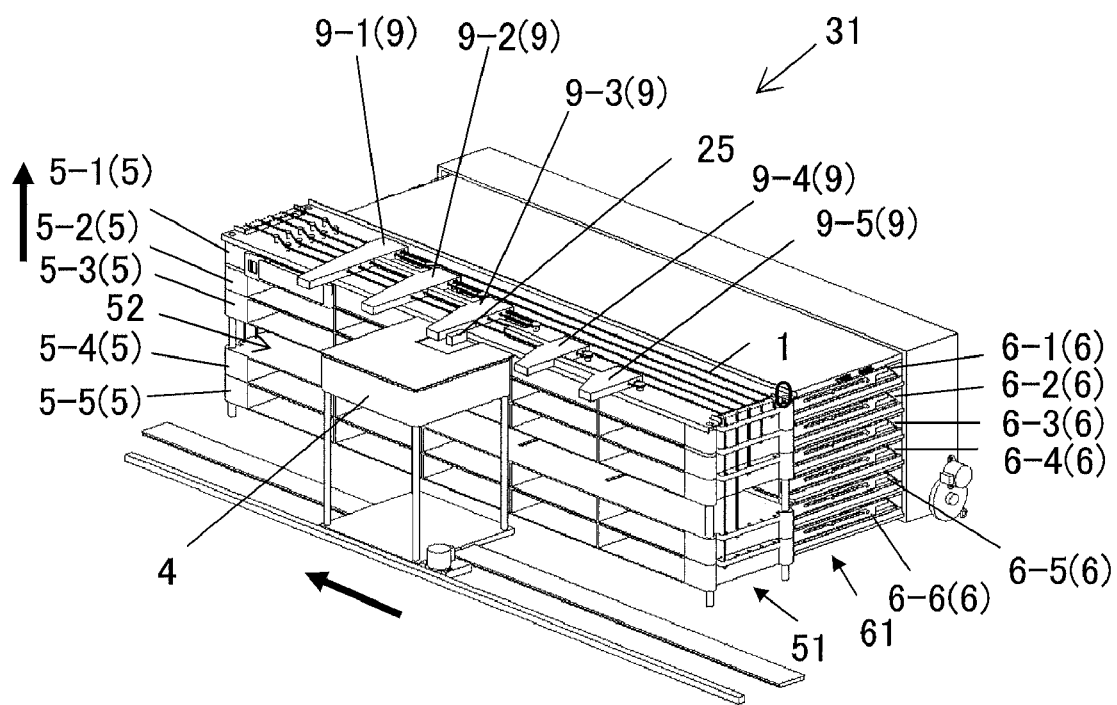
FIG. 10 is an explanatory diagram illustrating how a space is produced among vertically slidable cell groups.

(2) FIG. 10 is an explanatory diagram illustrating how a space is produced among the vertically slidable cell groups 5. When the robot 4 is moved toward the lever 9-2 as indicated by the arrow by a specific length, the lever 9-3 that is in contact with the projection 25 and the levers 9-2 and 9-1 on the left side of the lever 9-3 are, in conjunction, slid along the respective oblong holes 73. With the sliding of the levers 9-1 to 9-3, the wires 10 corresponding to the levers 9-1 to 9-3 are pulled upward, and the vertically slidable cell groups 5-1 to 5-3 are lifted as indicated by the arrow. Consequently, a space 52 is produced between the vertically slidable cell group 5-3 and the vertically slidable cell group 5-4 of the first movable shelf 51.

Figure 11A:
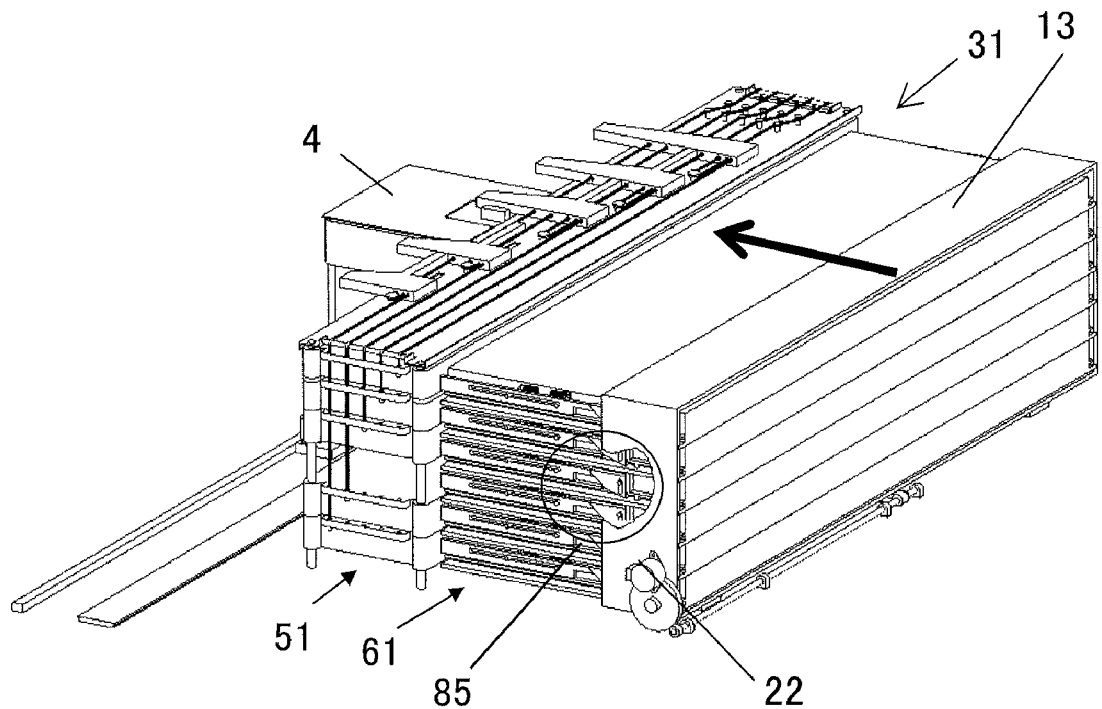
FIGS. 11A and 11B are explanatory diagrams illustrating how the horizontally slidable cell groups are moved.
Figure 11B:
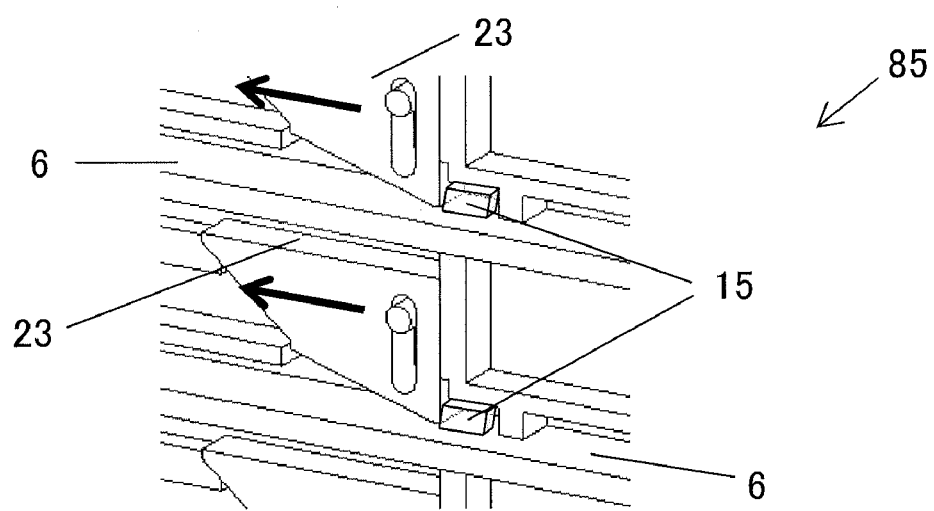

(3) FIGS. 11A and 11B are explanatory diagrams illustrating how the horizontally slidable cell groups 6 are moved.

When the motor 22 is driven by the movement control unit 46, the slide base 13 is moved toward the first movable shelf 51 (in the direction of the arrow) as illustrated in FIG. 11A. FIG. 11B is an enlarged view of a part 85 including some lock blocks 23 and relevant elements provided therearound. As illustrated in FIG. 11B, the blocks 15 of the slide base 13 come into contact with the lock blocks 23 of the horizontally slidable cell groups 6, thereby causing the horizontally slidable cell groups 6 to slide in the direction of the arrows, i.e., toward the first movable shelf 51. In this state, the vertically slidable cell groups 5 of the first movable shelf 51 are not in contact with the arm blocks 24.

Figure 12A:
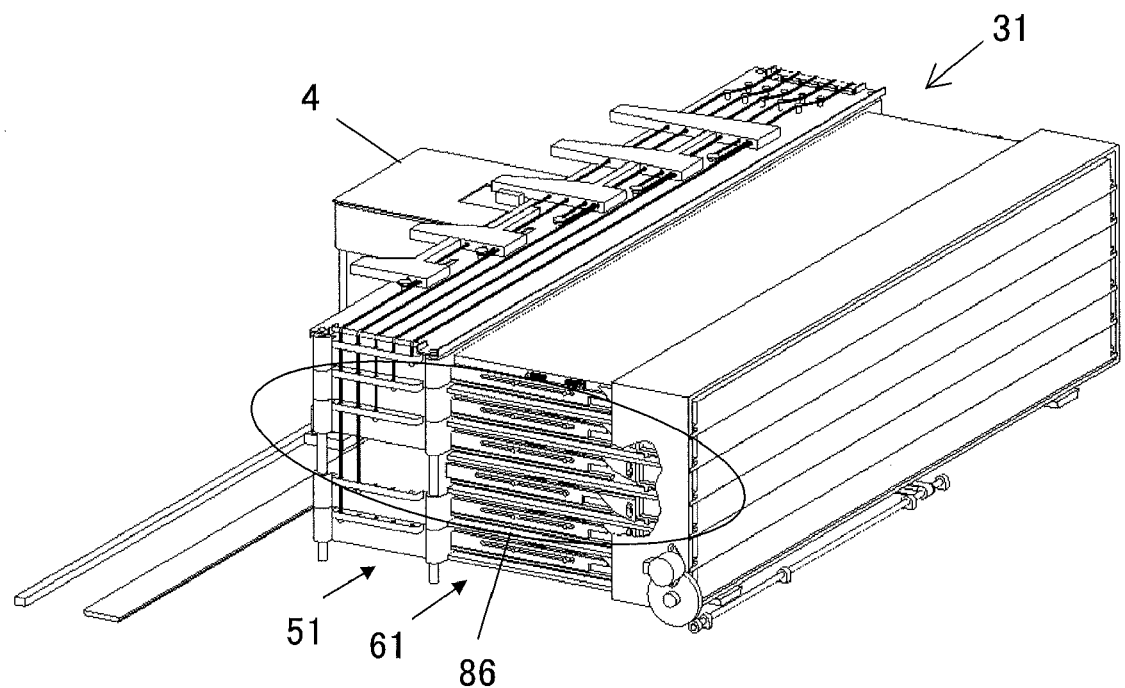
FIGS. 12A and 12B are other explanatory diagrams illustrating how the horizontally slidable cell groups are moved.
Figure 12B:
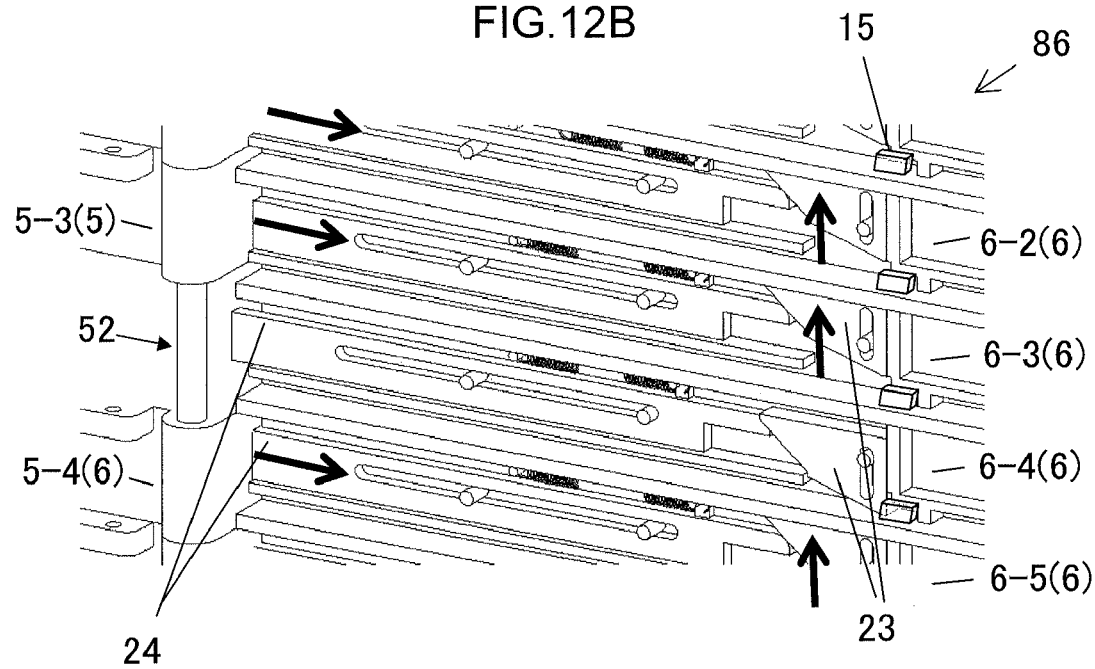

(4) FIGS. 12A and 12B are other explanatory diagrams illustrating how the horizontally slidable cell groups 6 are moved. FIG. 12A illustrates the location of a part 86 of the storage shelf 31. FIG. 12B is an enlarged view of the part 86 of the storage shelf 31. FIGS. 12A and 12B illustrate a state after the state illustrated in FIGS. 11A and 11B. When the blocks 15 gradually push the horizontally slidable cell groups 6 to slide leftward in FIGS. 12A and 12B, all the horizontally slidable cell groups 6-1 to 6-6 but the horizontally slidable cell group 6-4 receive external forces produced when the arm blocks 24 of the relevant horizontally slidable cell groups 6 come into contact with the corresponding vertically slidable cell groups 5. This causes the arm blocks 24 of the horizontally slidable cell groups 6 except that of the horizontally slidable cell group 6-4 to slide in the opposite direction, whereby the corresponding lock blocks 23 are pushed up. When the lock blocks 23 are pushed up, the blocks 15 cannot push the horizontally slidable cell groups 6. Therefore, the foregoing horizontally slidable cell groups 6 stop moving and stay at the positions of contact with the vertically slidable cell groups 5. Meanwhile, at a position corresponding to the space 52 produced by lifting the vertically slidable cell group 5-3, the arm block 24 does not slide in the opposite direction. The arm block 24 of the horizontally slidable cell group 6-4 does not come into contact with any vertically slidable cell groups 5 and therefore does not push up the corresponding lock block 23. Consequently, the horizontally slidable cell group 6-4 is further pushed by the block 15 and continues to slide.

Figure 13A:
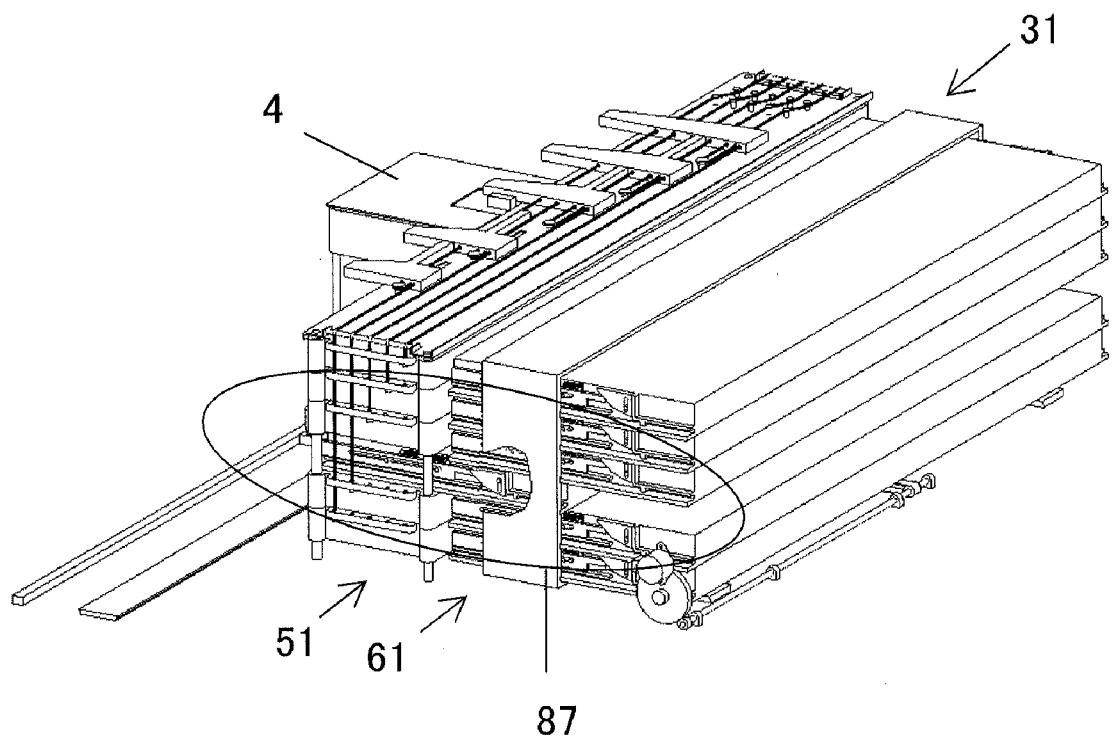
FIGS. 13A and 13B are yet other explanatory diagrams illustrating how the horizontally slidable cell groups are moved.
Figure 13B:
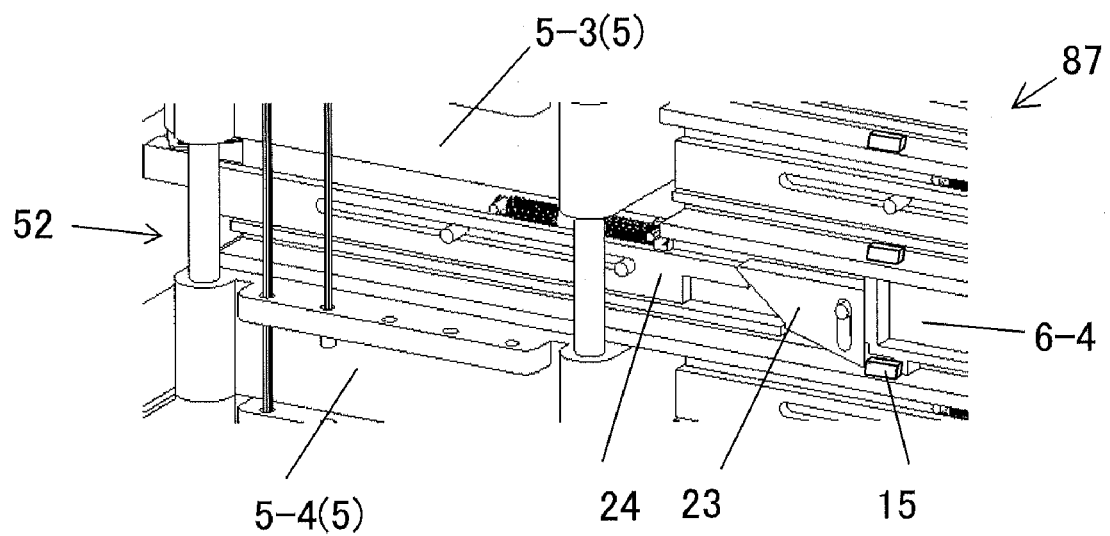

(5) FIGS. 13A and 13B are yet other explanatory diagrams illustrating how the horizontally slidable cell groups 6 are moved. FIG. 13A illustrates the location of a part 87 of the storage shelf 31. FIG. 13B is an enlarged view of the part 87 of the storage shelf 31. FIGS. 13A and 13B illustrate a state after the state illustrated in FIGS. 12A and 12B. When the slide base 13 is further moved leftward from the position illustrated in FIGS. 12A and 12B, only the horizontally slidable cell group 6-4 is moved into the space 52 produced between the vertically slidable cell group 5-3 and the vertically slidable cell group 5-4 and reaches the area accessible by the robot 4.

Figure 14:
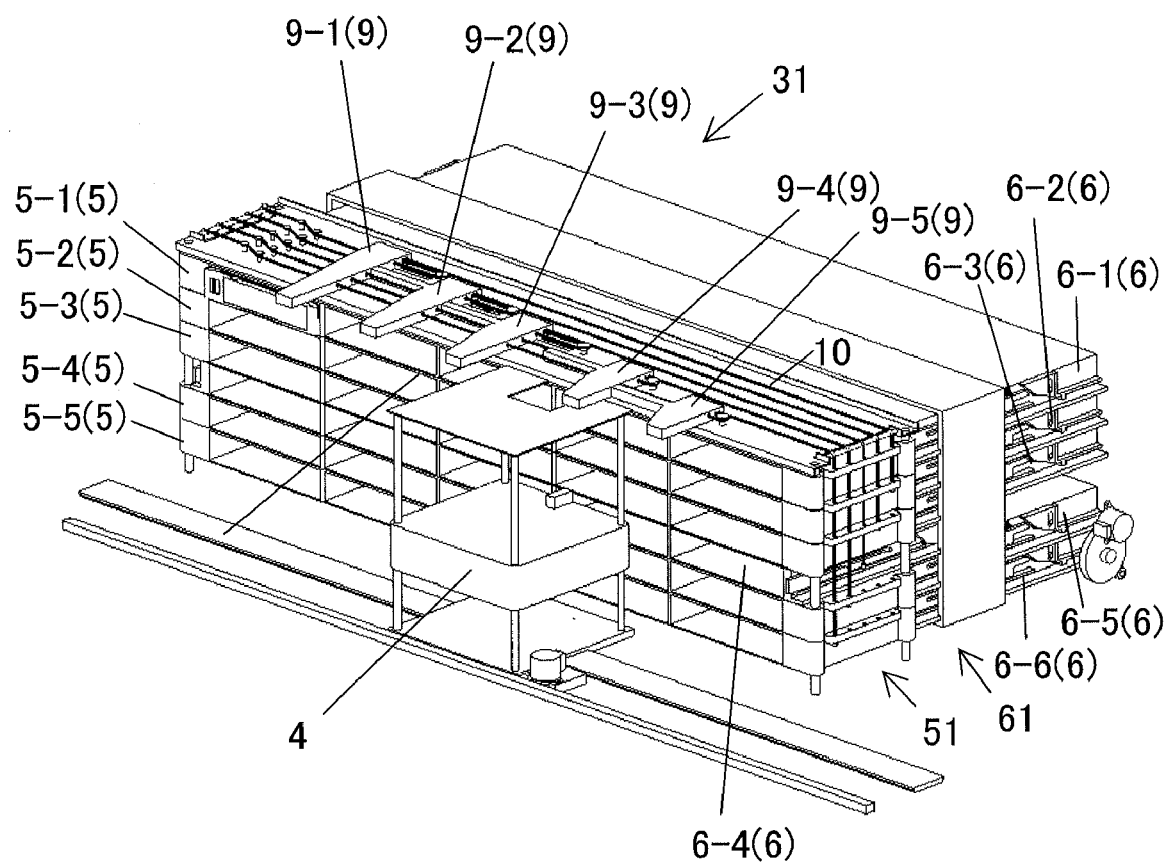
FIG. 14 is an explanatory diagram illustrating the completion of the movement of the horizontally slidable cell groups.

(6) FIG. 14 is an explanatory diagram illustrating the completion of the movement of the horizontally slidable cell groups 6. FIG. 14 illustrates a state after the state illustrated in FIGS. 13A and 13B. When the robot 4 is lowered as illustrated in FIG. 14, the projection 25 moves away from the lever 9-3. Therefore, the vertically slidable cell groups 5-1 to 5-3 that have been lifted fall under their own weights and rest on the horizontally slidable cell group 6-4 that has been moved as described above. Thus, the number of rows of cells 2 accessible by the robot 4 increases from five to six. In this state, the conveyance control unit 43 drives the robot 4 to take the storage medium 33 from the specified cell 2 included in the horizontally slidable cell group 6-4. Furthermore, the conveyance control unit 43 causes the robot 4 to convey the storage medium 33 and to load the storage medium 33 into the drive unit 3. Subsequently, the drive control unit 44 causes the drive unit 3 to read data from the storage medium 33 loaded as described above. The data thus read is transmitted from the communication control unit 45 to the host 95 via the drive control unit 44.

Figure 15A:
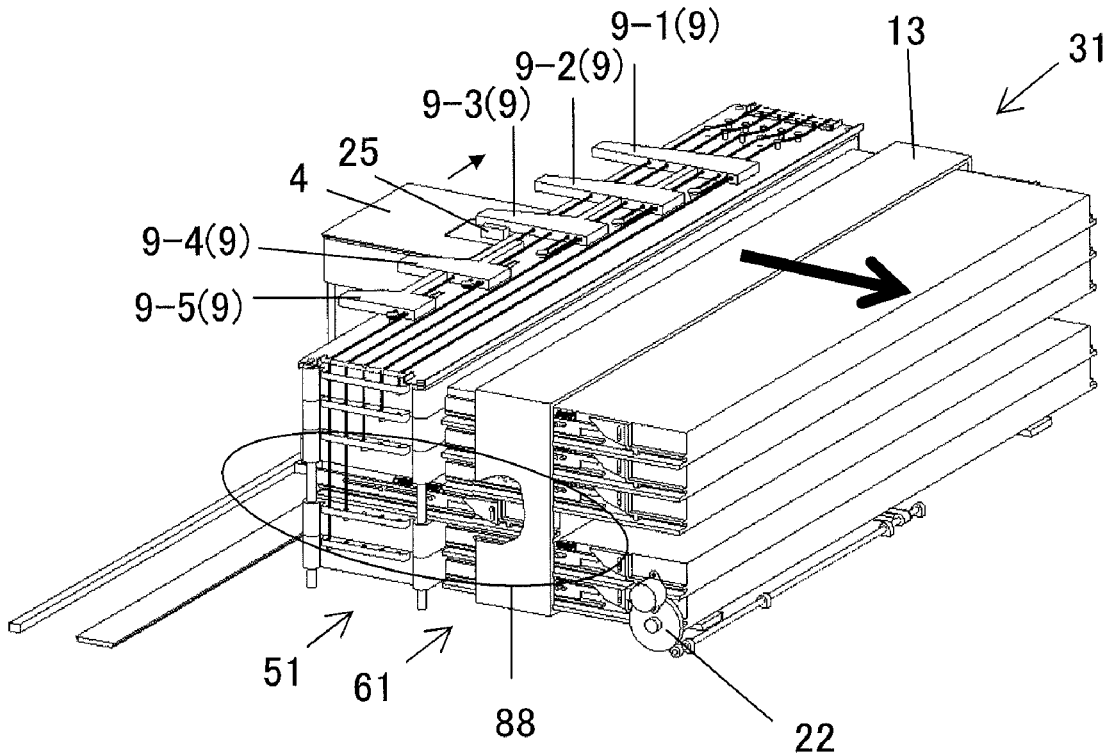
FIGS. 15A and 15B are explanatory diagrams illustrating a state before the returning movement of the horizontally slidable cell groups.
Figure 15B:
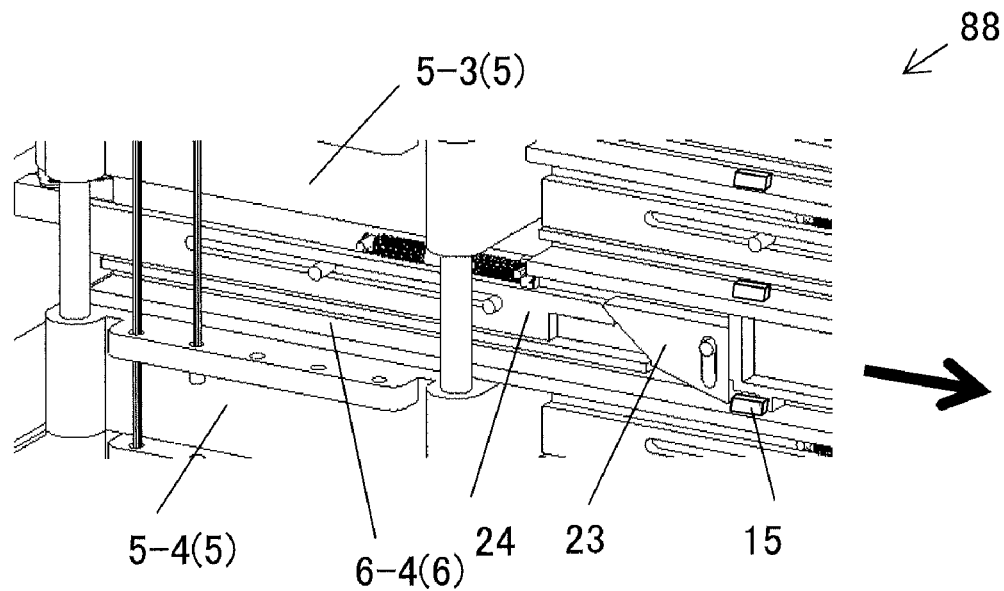

(7) FIGS. 15A and 15B are explanatory diagrams illustrating a state before the returning movement of the horizontally slidable cell groups 6. FIGS. 15A and 15B illustrate a state before starting to return the horizontally slidable cell groups 6 to the initial positions. FIG. 15A illustrates the location of a part 88 of the storage shelf 31. To return the horizontally slidable cell group 6-4 to the initial position, the movement control unit 46 causes the robot 4 to move to a position reaching the top board 8 between the lever 9-3 and the lever 9-4. Subsequently, the movement control unit 46 causes the robot 4 to move such that the lever 9-3 is pushed by the projection 25 toward the lever 9-2, whereby the levers 9-1 to 9-3 are in conjunction moved along the respective oblong holes 73. Thus, the vertically slidable cell groups 5-1 to 5-3 are lifted. FIG. 15B is an enlarged view of the part 88 of the storage shelf 31. When the vertically slidable cell groups 5-1 to 5-3 are lifted, the horizontally slidable cell group 6-4 becomes movable toward the initial position. Therefore, the movement control unit 46 causes the motor 22 to rotate in the reverse direction, whereby the slide base 13 is moved in the direction of the arrow illustrated in FIG. 15A. A more specific description will be given below.

Figure 16A:
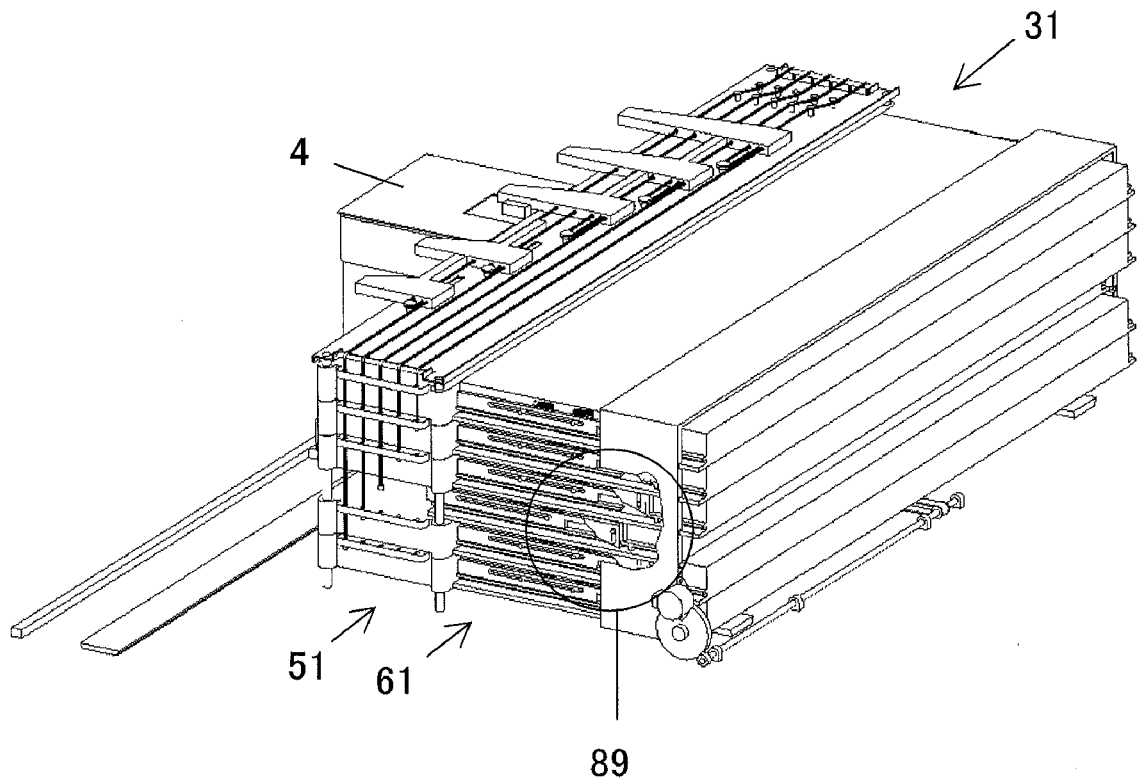
FIGS. 16A and 16B are explanatory diagrams illustrating the process of the returning movement of the horizontally slidable cell groups.
Figure 16B:
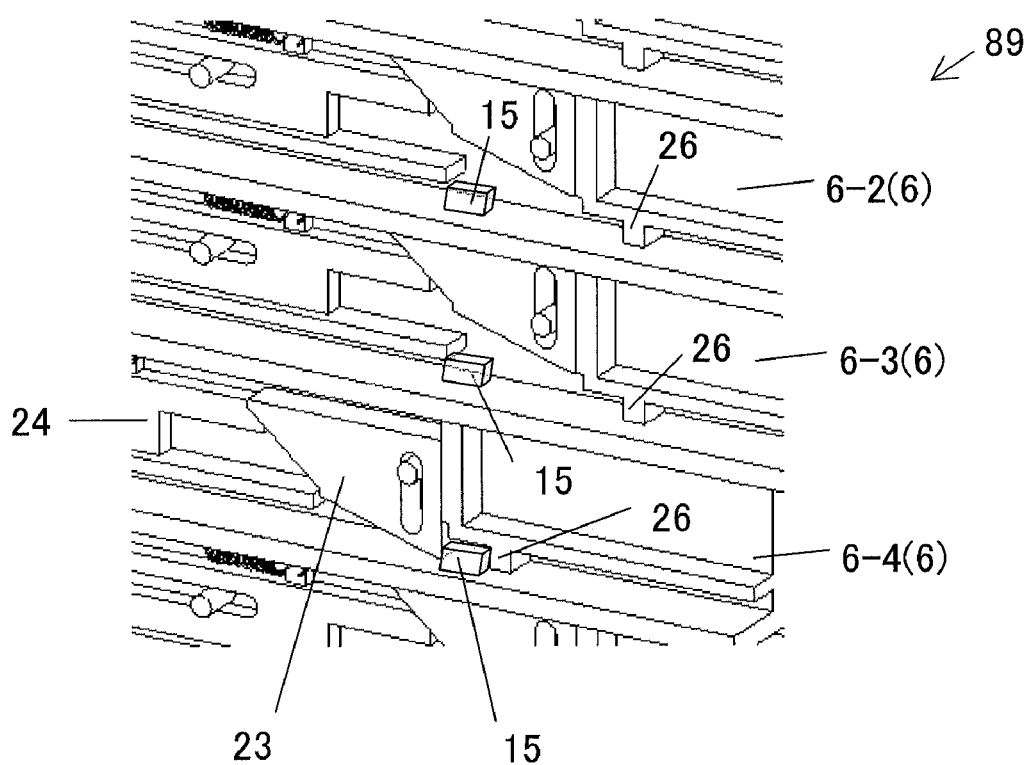

(8) FIGS. 16A and 16B are explanatory diagrams illustrating the process of the returning movement of the horizontally slidable cell groups 6. FIG. 16A illustrates the location of a part 89 of the storage shelf 31. FIG. 16B is an enlarged view of the part 89 of the storage shelf 31. When the motor 22 is rotated in the reverse direction and the slide base 13 is thus moved, the relevant block 15 on each side of the slide base 13 comes into contact with the stopper 26 of the horizontally slidable cell group 6-4 as illustrated in FIG. 16B, and the horizontally slidable cell group 6-4 starts to be pushed back. Subsequently, when the slide base 13 is further moved, the other blocks 15 come into contact with the stoppers 26 of the horizontally slidable cell groups 6-1 to 6-3 and the horizontally slidable cell groups 6-5 and 6-6, and the horizontally slidable cell groups 6-1 to 6-6, including the horizontally slidable cell group 6-4, are pushed back to the initial positions.

(9) The first movable shelf 51 is returned to the initial position by moving the projection 25 of the robot 4 that has been in contact with the lever 9-3 away from the lever 9-3. That is, the movement control unit 46 lowers the robot 4. Thus, the projection 25 is moved away from the lever 9-3, and the vertically slidable cell groups 5-1 to 5-3 return to the initial positions under their own weights.

To move the horizontally slidable cell group 6-1 at the topmost row of the second movable shelf 61, the movement control unit 46 causes the horizontally slidable cell group 6-1 to move horizontally to a position accessible by the robot 4, without moving the vertically slidable cell groups 5 of the first movable shelf 51.

To summarize, the library apparatus 1 includes the storage shelf 31 in which any of the horizontally slidable cell groups 6 of the second movable shelf 61 is movable into a space produced in the first movable shelf 51. Therefore, the first movable shelf 51 and the second movable shelf 61 are accessible from a single area, and no rotating mechanism is necessary. Furthermore, the position of the drive unit 3 has been changed such that the robot 4 can access the storage shelf 31 and the drive unit 3 in the same direction. Therefore, no rotating mechanism is necessary. Furthermore, the drive unit 3, which is oblong, is oriented such that the longitudinal direction thereof corresponds to the lateral direction of the casing 93, whereby the drive unit 3 and the storage shelf 31 are accessible in the same direction. Thus, dead spaces at the rear of the library apparatus 1 can be utilized efficiently, and the storage shelf 31 can be lengthened. By eliminating the necessity of the rotating mechanism and by changing the orientation of the drive unit 3, the numbers of rows and columns included in the storage shelf 31 can be increased. Consequently, the library apparatus 1 can provide increased spaces to be allocated to the storage shelf 31, the drive unit 3, and other units.

Specifically, while a known library apparatus can only store 40 reels of storage mediums (five rows by four columns times 2) at the maximum, the library apparatus according to the above embodiment having the same casing size as the known device can store 55 reels of storage mediums (five rows by five columns and six rows by five columns, at an increase rate of 37.5%) at the maximum.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A library apparatus comprising:
a storage shelf including a first movable shelf and a second movable shelf each having a plurality of rows and columns of cells in which storage mediums are to be stored, each of the rows of cells of the first movable shelf being movable vertically, each of the rows of cells of the second movable shelf being movable horizontally;
a drive unit for performing recording and reproduction of data into and from one of the storage mediums, the drive unit being disposed such that a direction of access to the drive unit for inserting/ejecting of one of the storage mediums is the same as a direction of access to the storage shelf;
a conveyor for conveying one of the storage mediums between the storage shelf and the drive unit and for inserting/ejecting one of the storage mediums into/from the storage shelf and the drive unit; and
a movement control unit for controlling to lift a row of cells of the first movable shelf to produce a space and to move horizontally a row of cells of the second movable shelf to a position in the space accessible by the conveyor.

2. The library apparatus according to claim 1, wherein the first movable shelf has a space between a top board thereof and a topmost row of cells thereof, and a topmost row of cells of the second movable shelf is movable into the space.

3. The library apparatus according to claim 2,
wherein the conveyor has a projection, wherein the first movable shelf has on the top board thereof a plurality of lifting levers connected to the respective rows of cells of the first movable shelf, and the movement control unit controls to slide horizontally by moving the projection one of the lifting levers corresponding to the specific row of cells of the first movable shelf and to lift the specific row of cells.

4. The library apparatus according to claim 1,
wherein the second movable shelf includes movement-disabling mechanisms provided for the respective rows of cells thereof and a movement drive unit moving all rows of cells thereof toward the first movable shelf, and when the movement control unit controls to move the second movable shelf toward the first movable shelf by driving the movement drive unit, the movement-disabling mechanisms disable the movements of the rows of cells of the second movable shelf that have come into contact with the first movable shelf and enable the movement of the row of cells that has been moved into the space in the first movable shelf.

5. The library apparatus according to claim 1, further comprising:
a casing that houses the storage shelf, the drive unit, the conveyor, and the movement control unit,
wherein the first movable shelf and the second movable shelf and the drive unit are provided on the same side with respective to the conveyor in the casing.

6. The library apparatus according to claim 5, wherein the first movable shelf is adjacent to the conveyor.

7. The library apparatus according to claim 5, wherein the second movable shelf is adjacent to the first movable shelf and is apart from the conveyor.

8. The library apparatus according to claim 5, wherein the conveyor moves in a horizontal direction and in a vertical direction.

9. A method for moving a shelf of a library apparatus, the library apparatus including a storage shelf including a first movable shelf and a second movable shelf each having a plurality of rows and columns of cells each in which storage mediums are to be stored, a drive unit for performing recording and reproduction of data into and from one of the storage mediums, the drive unit being disposed such that a direction of access to the drive unit for inserting/ejecting of one of the storage mediums is the same as a direction of access to the storage shelf, a conveyor for conveying one of the storage mediums between the storage shelf and the drive unit and for inserting/ejecting one of the storage mediums into/from the storage shelf and the drive unit, the method comprising:
specifying a cell of the second movable shelf;
determining a row of cells of the first movable shelf corresponding to the specified cell of the second movable shelf;
producing a space by lifting the determined row of cells of the first movable shelf; and
moving a row of cells of the second movable shelf including the specified cell horizontally to a position in the space accessible by the conveyor.

10. The method according to claim 9, wherein the library apparatus has a space provided between a top board of the first movable shelf and a topmost row of cells of the first movable shelf, wherein the moving step includes
moving a topmost row of cells of the second movable shelf into the space provided between the top board of the first movable shelf and the topmost row of cells of the first movable shelf.

11. The method according to claim 9, wherein the producing step includes
sliding horizontally one of lifting levers provided on the top board of the first movable shelf corresponding to the determined row of cells of the first movable shelf by moving a projection provided on the conveyor; and
lifting the determined row of cells by the sliding.

12. The method according to claim 9, the method further comprising:
moving rows of cells other than the row of cells of the second movable shelf including the specified cell horizontally; and
disabling movement of the rows of cells other than the row of cells of the second movable shelf including the specified cell, when the rows of cells of the second movable shelf have come into contact with the first movable shelf.

* * * * *